May 1, 1956    E. P. G. WRIGHT ET AL    2,744,159
MULTIPLEX ELECTRIC SIGNALLING SYSTEM
Filed Feb. 26, 1951    13 Sheets-Sheet 1
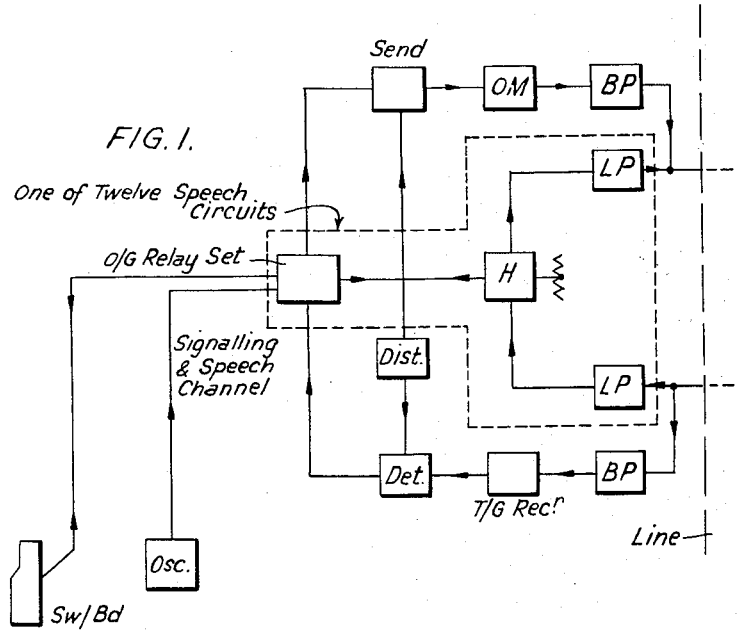
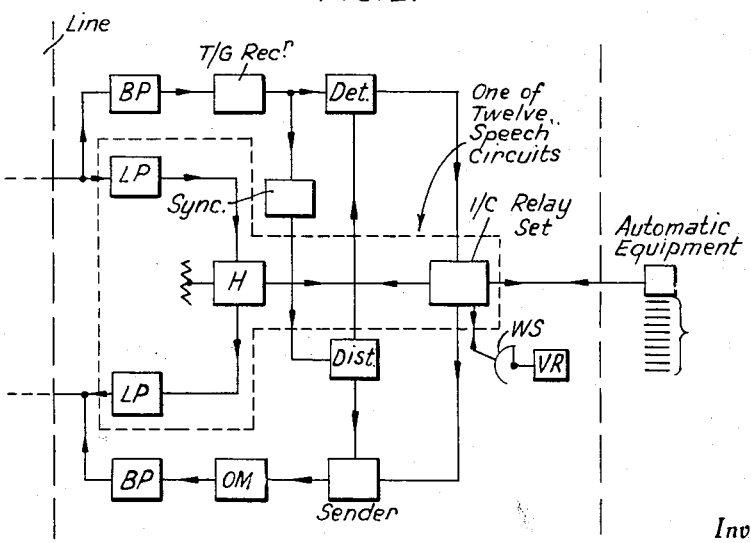
Inventors
ESMOND P. G. WRIGHT
GEORGE C. HARTLEY
DONALD A. WEIR
JOSEPH RICE
By
Attorney

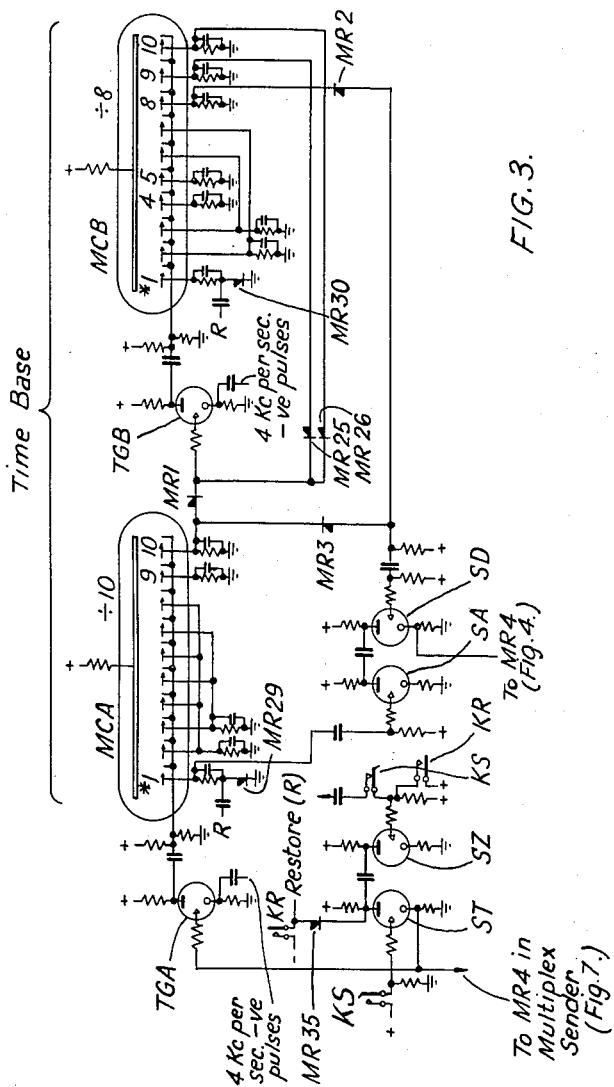

May 1, 1956 E. P. G. WRIGHT ET AL 2,744,159
MULTIPLEX ELECTRIC SIGNALLING SYSTEM
Filed Feb. 26, 1951 13 Sheets-Sheet 13

Inventors
ESMOND P. G. WRIGHT
GEORGE C. HARTLEY
DONALD A. WEIR
JOSEPH RICE
By
Attorney _United States Patent Office_ 2,744,159
Patented May 1, 1956

2,744,159

MULTIPLEX ELECTRIC SIGNALLING SYSTEM

Esmond Philip Goodwin Wright, George Clifford Hartley, Donald Adams Weir, and Joseph Rice, London, England, assignors to International Standard Electric Corporation, New York, N. Y., a corporation of Delaware Application February 26, 1951, Serial No. 212,723

Claims priority, application Great Britain February 28, 1950

24 Claims. (Cl. 179—15)

This invention relates to carrier telecommunication equipment and systems comprising signalling facilities over channels separate from and parallel to the carrier channels.

The object of the invention is to provide improved signalling facilities.

One feature of the invention comprises a multichannel carrier telecommunication terminal equipment for a carrier system comprising telecommunication channels and a telegraph channel, which comprises time division multiplied signalling equipment providing two-way signalling facilities for each and every one of the carrier communication channels via said telegraph channel.

Another feature of the invention comprises a multichannel carrier telephone terminal equipment incorporating speech channels, a single telegraph channel, equipment for detecting and transmitting over said telegraph channel signals on behalf of all said speech channels, an individual terminal circuit for each speech channel, means for connecting each said terminal circuit to regular telephone exchange equipment, means in each said terminal circuit for accepting D. C. supervision signals from exchange equipment, and for repeating said signals to said telegraph equipment for transmission over said telegraph channel and means in each said terminal circuit for responding to signals from said telegraph equipment and for repeating them to exchange equipment in the form of regular D. C. supervisory signals acceptable to the exchange equipment whereby the whole problem of handling exchange supervisory signals via the carrier channels is taken care of by the carrier equipment itself.

The invention will be clearly understood from the following description of one embodiment thereof shown in the accompanying drawings in which:

Figs. 1 and 2 together show, as block schematics, the terminal equipments for one of twelve carrier channels and the control and synchronised terminals of a time-division multiplex signalling channel associated with said carrier channels.

Figs. 3 and 4 together show the time-base and distributor of the control terminal.

Figs. 5 and 6 together show the time-base and distributor of the synchronised terminal and also the detection and alarm of out-of-phase arrangements.

Figs. 7 and 8 together show the multiplex sender and detector used at each end of the system; the distributor connections shown are those for the control terminal.

Figs. 9 and 10 together show an outgoing relay set designed for sleeve control to automatic working.

Figs. 11 and 12 together show an incoming relay set corresponding to the above.

The embodiment described comprises outgoing and incoming 12-channel carrier terminal equipment adapted for use in a semi-automatic telephone exchange system, the outgoing terminal being arranged to work in conjunction with an operator's switchboard provided with dials and the incoming end being arranged to work in conjunction with automatic exchange switching equipment.

The carrier equipment provides not only 12 4-wire speech channels but a 4-wire telegraph channel together with time-division multiplex sender and detector equipment for supervision signal transmission and reception over the telegraph channel to serve all the speech channels. Dialled digits are transmitted over the speech channels themselves on a voice-frequency basis.

The time-division multiplex equipment operates on a basic time cycle having twenty-eight elements. Simple telegraph code signalling of mark and space respectively is used. To give the necessary number of supervisory signals per channel two elements are allocated to each channel, thus utilising twenty-four elements for signalling purposes, the other four being provided for inter-terminal synchronising and phasing purposes.

At each terminal, a multiplex sender and a separate multipled detector are provided, associated with the "go" and "return" paths of the 4-wire telegraph signal channel. The operations of both the sender and the detector of a terminal are time-controlled by the same pulse distributor. The time-division pulses for each terminal are separately and independently generated from respective 4 kc./s. carrier frequency supplies by means of electronic frequency dividers each comprising multigap cold-cathode gas-discharge counting tubes of the type described in U. S. Patents No. 2,636,681 and 2,553,585.

The divider at each terminal feeds 50 cycle per second pulses to the distributor which distributes the pulses to control the operations of the respective transmitter and detector.

One terminal is utilised as a control terminal and the other as a controlled terminal from the point of view of time-element synchronisation.

A starting operation at the control terminals starts up the frequency divider and distributor at the same terminal and signals to the controlled terminals to do likewise. The controlled terminal continually checks the synchronism of the two distributors by comparing the receipt of signal changes with the condition of its own distributor. The controlled terminal is also provided with means for correcting slight out-of-synchronism conditions; the controlled divider distributor is provided with two pulse supplies 180° out of phase, one of which is normally used and the other is used for interpolating an additional pulse when required to correct a lag. To slow down, a normal stepping pulse is withheld from the time-base. Alarm circuits will also be described which indicate such conditions as sustained out-of-phase running due to a faulty distributor, or the like.

Figure 9:
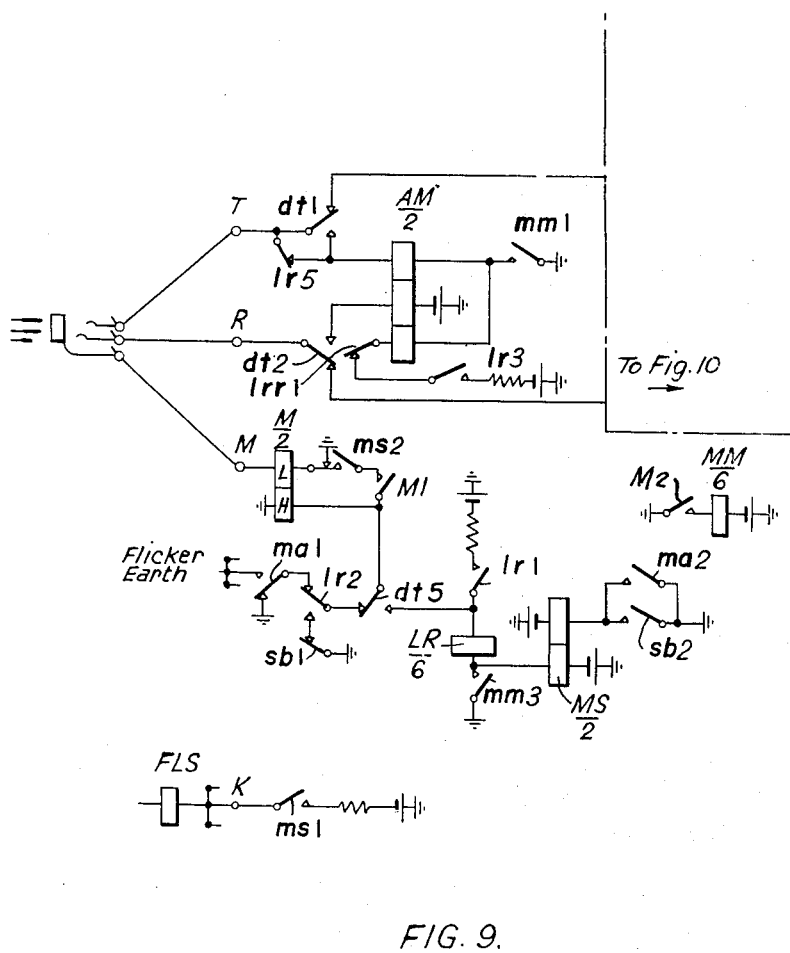

Referring now to Figs. 1 and 2 SW/BD indicates an operator's switchboard at one telephone exchange from which access is obtainable to the carrier channels by plugging in to jacks each terminating one of said channels. Each jack, as shown in detail in Fig. 9, gives access to an outgoing relay set individual to the corresponding speech channel.

Each outgoing relay set gives access via its speech channel to its hybrid coil H and so to the carrier modulation and demodulation equipment (not shown) and to line.

One of the twelve V. F. speech channels provides the telegraph channel of say 120 cycle/second bandwidth, at the upper end of its range. It is this channel which is shown in Figs. 1 and 2 and the separation of this channel and the telegraph channel is indicated by the use of low pass filters L. P. between the speech channel paths and the line, and by the use of band pass filters BP between the telegraph channel paths and the line.

The outgoing relay set of the speech channel in question is connected over separate paths to a telegraph sender SEND and to a telegraph detector DET. The sender SEND is connected to an oscillator modulator which applies the telegraph signals to the V. F. telegraph band, the modulated V. F. thus passing via the bandpass filter BP.

The detector DET is connected to a telegraph receiver T/G Rec.ʳ which is in turn connected to the band pass filter of the return leg of the 4-wire line.

All the above equipment is duplicated at the incoming end which also includes a plurality of voice frequency receivers VR each connected to a wiper switch WS having access to the twelve incoming relay sets. An incoming seizure signal results in the seizure of an idle V. F. receiver, whose switch WS then makes connection to the incoming relay set in question.

An oscillator OSC supplies V. F. current for dialling to the outgoing relay sets.

The operation of the time-base and distributor at the control terminal will now be explained with reference to Figs. 3 and 4.

A 4 kc./sec. frequency is obtainable at the carrier terminals; to provide the necessary telegraph speed it is necessary to have a dividing arrangement. For the case under consideration a speed of 50 bauds has been assumed although by varying the time-base circuit other speeds are possible commensurate with the available bandwidth of the signalling channel. Auxiliary equipment is used to provide a train of negative pulses with a repetition rate of 4 kc./sec. If more than one 12-channel carrier group is in use at a station the pulse producing equipment can be common to several signalling systems.

Figure 4:
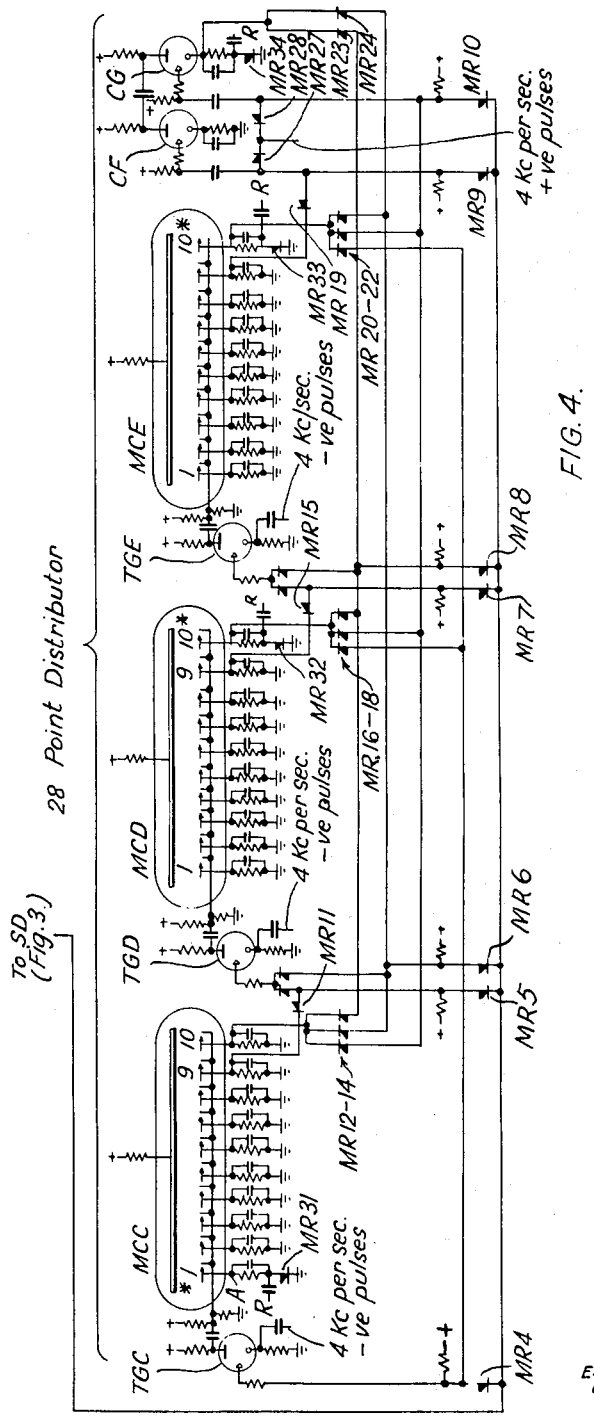

Fig. 4 shows a 28-point distributor which is used for transmitting the 4 phasing and the 24 signalling elements required for the 12-channel group and for directing the incoming elements to the correct speech channels. This distributor could be composed of individual tubes but for convenience and economy three 10-point multi-cathode tubes, MCC, MCD, and MCE and two individual trigger tubes, CF and CG, have been connected so as to give the necessary 28 outlets.

As the supply to the equipment comes on, gaps in the various multi-cathode and individual trigger tubes strike indiscriminately. KR (Fig. 3) is operated, one contact causing SZ to strike and the other at the same time applying a negative voltage to the restore lead so that the glow discharge in the multi-cathode tubes and individual tubes is as indicated in the drawing by an asterisk.

It should be noted that during the following description the notation MCC K5 will, for example, refer to the fifth cathode of multi-cathode tube MCC.

The initiation of the glow on MCA K1 will cause tube SA to strike. The gates formed by the tubes TGA, TGB, TGC, TGD and TGE are closed. When the start key, KS is operated, start tube ST will strike so extinguishing SZ. The positive bias from the cathode of ST will open the gate TGA and also cause a reversal of the signal from the sender which is to be described later. The other gates remain closed. The negative pulses which are allowed to pass through the gate TGA drive MCA which makes one step for each pulse. When the glow in MCA reaches cathode K10 the positive bias opens gate TGB via rectifier MR1, and the next negative pulse which steps MCA to K1 will step MCB to K2. The stepping of MCA removes the bias from MR1 and TGB is closed again. MCA continues to step under control of TGA; once per cycle of MCA the bias from K10 opens TGB and allows MCB to make one step, so that MCA is operating as a divide-by-10 counter. The respective speeds of MCA and MCB will be 4000 and $$\frac{4000}{10} = 400 \text{ steps per second}$$

When MCA has made seven complete cycles, MCB will have stepped to K8, causing MR2 to be biassed positively, but since MR3 is at ground potential SD cannot strike. However, when MCA steps to K10 in this cycle, both MR2 and MR3 will be biassed positively, so causing a positive pulse to pass to the trigger of SD. This pulse together with the positive trigger bias is sufficient to strike SD and so extinguish SA. The firing of SD will bias MR4—MR10 positively. Since MCD K10 and MCE K10 are discharging, MR16 and MR20 will be biassed positively; these positive biasses in conjunction with the positive bias on MR 4 wil open gate TGC to the negative pulses. The next negative pulse which steps MCA to K1 and MCB to K9 will step MCC to K2, the second point of the distributor. MCA stepping to K1 causes a positive pulse to pass to the trigger of SA, so striking SA and extinguishing SD. This removes the bias from MR4—MR10 and so TGC is closed again. Previously when MCA stepped to K1 gate TGB was closed, but this cycle it remains open, due to the bias from MCB K9 via rectifier MR25, so that as MCA steps to K2, MCB steps to K10. Again TGB remains open due to the bias from K10 via the rectifier MR26 and the next negative pulse steps MCA to K3 and MCB to K1. Since there is no longer a bias to keep TGB open, MCB now stops. The two extra steps of MCB just described are made so that the 10-point multi-cathode tube can be used as a divide-by-8 counter. In effect MCB K9 and K10 are extensions of K1, so that the circuit behaves in the same way as if the glow stepped direct from K8 to K1. MCB is used as a divide-by-8 and not a divide-by-10 counter, so that a speed of 50 bauds, which coincides with a distributor stepping speed of 50 steps per second, can be obtained from the 4 kc./sec. supply provided by the 12-channel carrier terminals. Since $$50 = \frac{4000}{80} = \frac{4000}{10 \times 8}$$

it is convenient to have one divide-by-10 and one divide-by-8 counter. If the basic frequency had been 5 kc./sec. both MCA and MCB would have been divide-by-10 stages. For receiving, the timing for the multiplex detector is obtained from MCA K1 and MCB K5; the coincidence of the glow of these two cathodes takes place after half a revolution or 4 steps of MCB, i. e. after receipt of forty pulses at 4 pulses per millisecond: 10 milliseconds from the commencement and thereafter at 20 millisecond intervals.

MCA continues to step, and in each cycle, as MCA passes from K10 to K1, MCB makes one step until again MCB reaches M8. Also, each time MCA reaches K10 with MCB at K8, MR2 and MR3 are both biassed positively so that SD will strike and bias MR4—MR10 positively. The combination of the positive biasses on MR4, MR16 and MR20 allows TGC to open and the next pulse which steps MCA to K1 and MCB to K9 will step MCC after which TGC is closed by the striking of SA which removes the positive bias from MR4—MR10. Each time SD is struck, that is for one pulse duration in every 8 cycles of MCA and one cycle of MCB, MCC will make one step until eventually it reaches K9. The next time SD strikes the biasses on MR4, MR16 and MR20 open TGC and the biasses on MR5 and MR11 opens TGD: the next pulse steps MCC to K10 and MCD to K1, i. e. the 10th point of the distributor. When MR4—MR10 are again biassed positively TGC remains closed, owing to the removal of the bias from MR16, but TGD is opened by the combination of the positive biasses on MR13, MR22 and MR24 and MCD only will step. In a similar manner to the operation for MCC, MCD will continue to step until when it steps from K9 to K10, MCE will step to K1 after which MCD stops and MCE continues. When MCE reaches K9, MR19 is biassed positively. The subsequent striking of SD biasses MR9 positively and the next positive pulse on MR27 will strike CF, which extinguishes CG. The positive pulse supply is in phase with the negative pulse supply; therefore, CF strikes at the same time as MCE steps to K10. CF provides the 28th point of the distributor. The next time SD strikes, TGC will be opened by the combination of the positive biasses on MR4, MR16 and MR20 and the next negative pulse steps MCC to K1 whilst the positive pulse in phase with it strikes CG, which extinguishes CF, by the combination of the positive biasses on MR10, MR12, MR17 and MR21. Thereafter the operation continues as for the cycle just described. It should be noted that MCC K10, MCD K10, MCE K10 and the cathode of CG are not used as distributor points but provide convenient rest positions when the other sections of the distributor are in use.

To stop the time base and distributor, KS is restored. However, the stop tube SZ does not strike immediately and stop the operation, but when point A, which is connected to MCC K1, goes positive SZ is allowed to strike. This arrangement is to ensure that, if KS is restored in the middle of a cycle, all the elements comprising a cycle of operation are transmitted before the equipment is stopped and the control terminal is left in the true rest condition. A will go positive when the distributor returns to MCC K1, that is when MCA steps to K1 and MCB to K9. When SZ strikes, a negative pulse passes to the rest cathodes via the restore lead, so that all gates are closed and all tubes are in the rest condition.

In case some adjustment is made during the interval before restarting and the glow rest condition has been changed, when the start key is thrown there is a circuit arrangement which repositions the glow correctly. The anode of ST is connected via rectifier MR35 and condensers to rectifiers MR29—MR34 which are in the circuits of the cathodes on which the glow for the rest condition should be present. Normally these rectifiers have no part in the operation. When ST strikes and its anode goes negative, a negative pulse is applied to these cathodes, thus causing the glow to transfer to them, if not already there.

The reset key, KR, is included for a similar purpose. If a fault occurs it is possible that the time-base and distributor will stop in other than the rest condition and, although KS is restored, since A cannot become positive if the distributor does not step back to MCC K1 then SZ cannot strike to stop the operation. In these circumstances KR is operated which applies a positive bias to the trigger of SZ sufficient to cause SZ to strike. At the same time a negative voltage is applied to the restore lead, thus applying a negative pulse to the rest cathodes, causing the glow to transfer to the rest condition. As shown, the restore key is non-locking. Rectifier MR35 is included to block the negative potential applied when KR is operated, from the start-stop tubes to prevent spurious operation.

Figure 5:
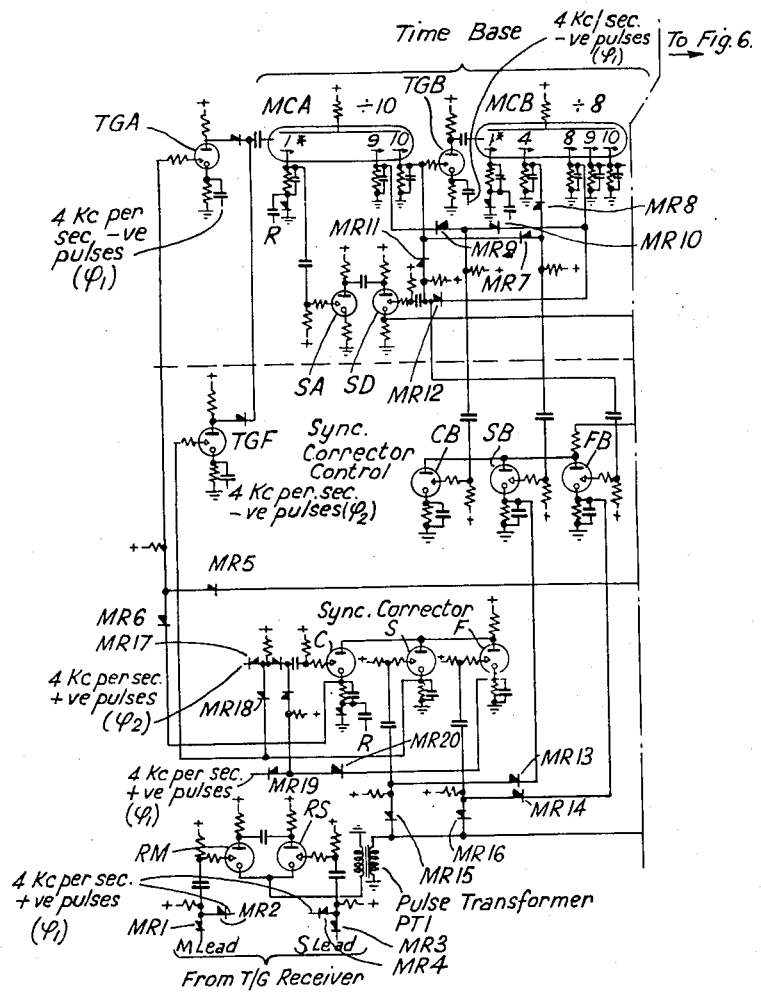
Figure 6:
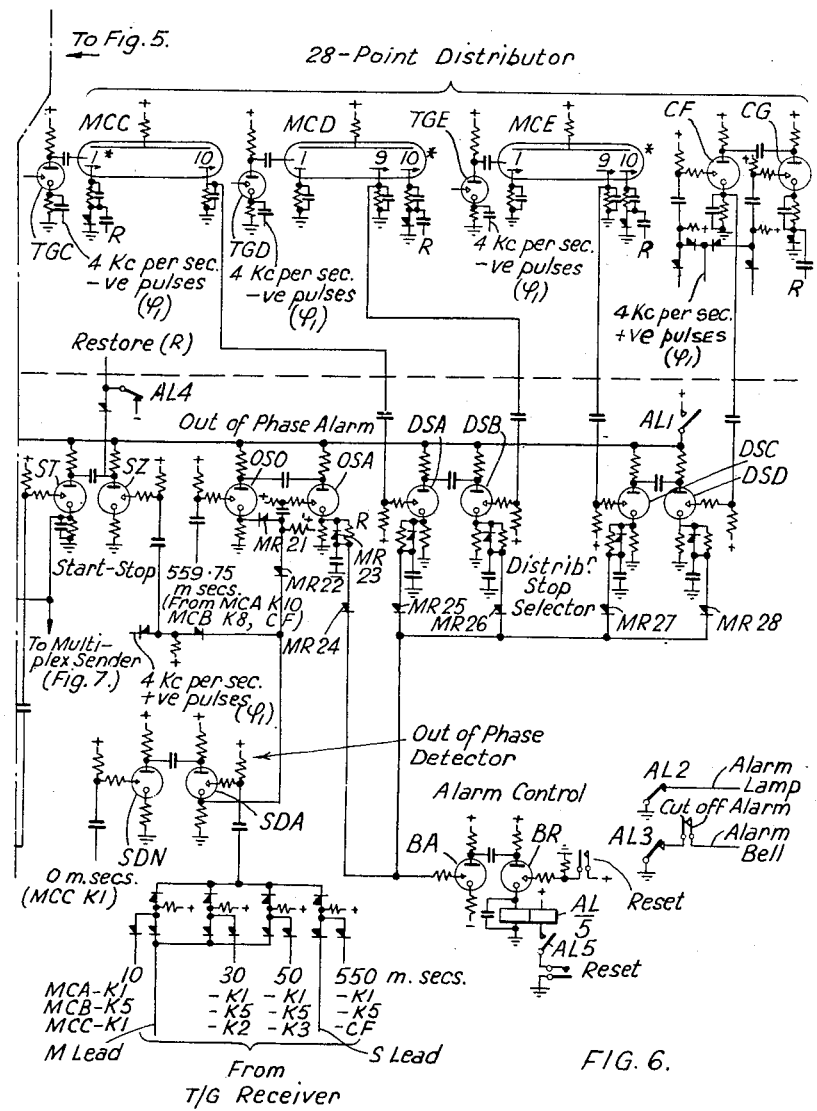

The circuit for the synchronised terminal is shown in Figs. 5 and 6. The time base and distributor at this terminal are the same as for the control terminal with the exception of the operation of the start-stop tubes. Starting must be under control of the control station and so the start tube at the synchronised terminal is fired by means of a reversal of the received signal over the S and M leads (bottom of Fig. 5) instead of by a start key. The method of stopping the operation will be described in the following.

The synchronised terminal must be speeded up or slowed down to keep it in step with the control terminal and to effect this, two pulse supplies are used. The two supplies give negative pulse trains of 4 kc./sec. repetition frequency which are phase-displaced by 180 degrees relative to one another. In Figs. 5 and 6 the pulse trains have been referred to as ($\phi_1$) and ($\phi_2$), respectively, to show the phase relationship. Both pulse supplies are available for steping MCA, one via TGA and the other via TGF, but ($\phi_1$) only is used for stepping the remainder of the tubes in the time base and distributor. Two further supplies in phase with the two above, but of positive polarity, are provided to restore conditions to normal after a speed change has been made.

In the rest condition the glow on the time base and distributor tubes is as indicated in the case of the control terminal; and C (Fig. 5), in the synchronising corrector, is also struck. Tubes SA (Fig. 5) and SDN (Fig. 6) also will be struck when the glow appears on MCA K1 and MCC K1 respectively. Since the line condition prior to operation is mark, producing a positive potential on the "M" lead at the bottom of Fig. 5 and an earth potential on the "S" lead, RM in the reversal pair will be struck. When the equipment is to be used, the reset key (lower right corner of Fig. 6) is operated to apply (by means of its upper contact) a positive potential to the trigger of BR, in the alarm control, sufficient to strike BR and so operate relay AL. AL1 (right center, Fig. 6) applies the anode voltage to the synchronising corrector control, (Fig. 5) the start-stop, (Fig. 6) the out of phase alarm (Fig. 6) and the distributor stop detector (Fig. 6), none of which will strike until triggered from some external source. AL2 and AL3 (lower right, Fig. 6) disconnect the visible and audible alarms, AL4 (left center, Fig. 6) removes the negative voltage from the restore lead and AL5 completes the circuit of the second winding of AL, the purpose of which will be explained later.

When the control terminal is started, the line condition received by the synchronised terminal is changed from mark to space and a positive potential appears on the "S" lead at the bottom of Fig. 5; this change is used as the start signal at the synchronised terminal. The space condition biasses MR3 positive, so that when MR4 is biassed positively by the next positive 4 kc./sec. ($\phi_1$) pulse, RS will strike and RM will be extinguished. For a short duration both RS and RM will be struck which causes an increase of current in the common cathode circuit which consists of the primary of a pulse transformer, PT1. A positive pulse is produced in the secondary of PT1 and this pulse together with the standing positive bias on ST causes this tube to strike. MR5 is biassed positively and in conjunction with the positive bias on MR6 opens gate TGA. Negative pulses ($\phi_1$) pass to MCA causing this tube to step. The change of bias from the cathode of ST is also used to change the transmitted line condition from mark to space in a manner to be described later; this change is not used at the control terminal but is a simple means of ensuring that the rest condition of the line is mark.

It is possible to arrange that the first element, which is also the element transmitted when at rest, is always a mark at the synchronised terminal, but this would mean that the two terminals would differ slightly and it is considered that simplification is attained if the two stations use similar equipment as far as possible, provided that the cost is not affected.

The time base and distributor now operate as described in relation to the control terminal, except when the two ends get out of synchronism due to a difference between the master frequencies at the two terminals. As was seen in the previous description when MCA steps from K10 to K1 and MCB from K8 to K9 the distributor steps one position, i. e. from one element to the next in sequence. If the synchronised terminal is in step with the received signal, and, therefore, in synchronism with the control terminal if signal transit time on the line is ignored, when the received signal is changing from one element to the next the glow on MCB K8 will be on the point of transfer to K9. Thus, if the received signal is undergoing a reversal, the time of this reversal can be compared with the glow in MCB and the result of the comparison used for effecting necessary changes. The proviso regarding the signal transit time is satisfied in the vast majority of practical cases; the modification for the exceptional cases is dealt with later when describing the multiplex sender. If a reversal occurs which shows that the synchronised terminal is too fast a pulse to MCA is suppressed and if to slow, a pulse is admitted via TGF to give an extra step.

If the transmitted and received elements are exactly in phase it would be necessary to consider the pulse which stepped MCA from K10 to K1 as the pulse which causes the reversal pair to change over (if a reversal is present in the received signal). This means that if a reversal of the incoming signal occurred when MCA stepped from K9 to K10 the synchronised terminal would be too slow and so a pulse ($\phi_2$) would have to be used to give MCA an extra step. The pulse ($\phi_2$) would step MCA to K1, the result being that MCB and the distributor tube in use at the stage would not be stepped by the next pulse ($\phi_1$): MCA would have to perform another cycle before these tubes could step and the two terminals would get badly out of synchronism. It is possible to arrange that a reversal occurring at this part of the cycle does not cause MCA to step under control of a pulse ($\phi_2$) but this would mean that reversals occurring either as MCA stepped from K9 or K10 would have to be considered as correct synchronism. However, a simple answer is to arrange that a reversal occurring as MCA steps from K9 to K10 is taken as correct synchronism and if the reversal occurs as MCA steps from K10 to K1 the synchronised terminal is considered as being too fast. In practice this simply means that the second element transmitted by the synchronised terminal after the start will be distorted by .25 millisecond and that the start of a transmitted element is .25 millisecond after a received element. However, the two terminals will remain synchronised for this and for no other condition.

In the first cycle of operation after the start signal has been received, when MCA steps to K10 with MCB on K4, MR7 and MR8 are biassed positively, so that a pulse passes to the slow bias tube SB in the synchronising corrector control circuit, causing it to strike. This tube remains struck until the time base reaches MCA K9 and MCB K8, when MR9 and MR10 are biassed positively causing CB, the correct bias tube, to strike and extinguish SB. Similarly when the time base reaches MCA K10 and MCB K8, MR11 and MR12 are biassed positively, and not only does SD at the control terminal strike, as described above, but also FB, the fast bias tube, will strike and extinguish CB, and remain struck until extinguished by the striking of SB in the next cycle of MCB. Thus, whilst CB is struck a received element should change to the next element, but if the change is whilst SB is struck the indication is that the synchronised terminal is too slow and if the change is whilst FB is struck the indication is that the synchronised terminal is too fast.

MR13 and MR14 are biassed from the cathodes of SB and FB respectively. Consider first of all the case when a reversal occurs during the time that SB is struck, i. e. the synchronised terminal is too slow and must be speeded up. The reversal causes a positive pulse to be developed in the secondary of PT1 which applies a positive bias to MR15. The combination of the biasses on MR13 and MR15 strikes S, in the synchronising corrector, and so extinguishes C. TGA is closed by the removal of the bias from MR6 and TGF is opened by the bias from the cathode of S. The time base tube MCA is now under control of the negative pulses ($\phi_2$) and the next pulse of this train steps MCA. At the same time a positive pulse ($\phi_2$) is applied to MR17 which, together with the positive bias on MR18 from S, causes C to restrike and extinguish S. The time constants in the cathode circuits of the synchronising corrector are such that the rise and the fall of the cathode potentials cause the switch-over of the pulse drive to the time base to occur between a pulse ($\phi_1$) and a pulse ($\phi_2$) or vice versa. As a result of this operation an extra pulse is applied to MCA, so effecting the increase in speed necessitated by the fact that the reversal occurred before the time base indicated it should be expected.

If the reversal occurs whilst FB is struck, that is, the synchronised terminal is too fast and must be slowed down, MR14 is biassed positively so that when the reversal biasses MR16 positively, F will strike and extinguish C. The result of this is that both TGA and TGF are closed. The next positive pulse ($\phi_1$) will bias MR19 positive and this, together with the positive bias on MR20 from F, will restrike C. The negative pulse ($\phi_1$) which occurred at the same time will not be allowed to pass through TGA, and so one pulse is suppressed and MCA slowed accordingly, as was required by the fact that the reversal occurred after the time base indicated it should be expected. In the case when the reversal occurs whilst CB is struck i. e. as the expected time for correct synchronism, neither S nor F will be struck by the reversal and the stepping of MCA remains under the control of the pulses ($\phi_1$) applied via TGA.

Corrections to the speed are made only at the time of reversals and even then only when necessitated. For cases when speed correction is carried out, either an extra pulse ($\phi_2$) is added to, or a pulse suppressed from, the pulses ($\phi_1$) stepping MCA. Thus, according to whether the synchronised terminal is too slow or too fast, the duration of the element being transmitted by the terminal at this part of the cycle is either $$\frac{(8\times 10)-1}{4000}\times 1000 = 19.75 \text{ milliseconds}$$

or $$\frac{(8\times 10)+1}{4000}\times 1000 = 20.25 \text{ milliseconds}$$

The distortion introduced by the method of synchronisation control described is, therefore, $$\pm\frac{.25}{20}\times 100 = \pm 1.25\%$$

which is well within practical tolerances.

The need for phasing elements in addition to the arrangements for ordinary synchronisation is as follows. If one of the distributors misses a step it is possible that this distributor will continue to run out of step and all twelve channels will become wrongly connected.

Since the "space-space" combination has not been used to indicate a signalling condition the use of three space elements for phasing is possible. Using such an arrangement, if one of the distributors misses a step, the elements scanned in what should be the time position of the three synchronising elements will be, in fact, two of the synchronising elements and a signalling element (either a space or a mark). If the signalling element is a space it will give the same result as a phasing element which is also a space, but, if the signalling element is a mark then the out of phase condition can be detected. This means that the phasing signal must consist of three space elements and one mark element.

This arrangement has several advantages. This requires that some or all the phasing elements must appear consecutively at the beginning of the cycle. It has been found advantageous to make the first element a space. In the rest condition this element is changed to a mark, the normal line condition when at rest, under control of the start-stop arrangement. The start signal changes this element to space, which gives the necessary reversal to start up the distant terminal equipment, and this element remains as a space phasing element until the stop signal is given when it reverts to mark. The location of the mark phasing element in the last position makes it possible to rephase if the two stations get out of step.

There must be a reversal between the last and first elements which means that if the out of synchronism condition is detected and the distributor is returned to its start position this reversal will restart the distributor. If a fault occurs which makes it impossible to run in step, an alarm can be given after a predetermined time.

The phase detection, reset for the out of phase condition and giving an alarm if the out of phase condition persists is provided by the tubes SDN, SDA, OSO and OSA, Fig. 6. The first three and the last elements in a cycle of operations should be three spaces and a mark respectively. The output from the telegraph receiver is examined at the correct times for these elements. With the equipment prepared for starting, the incoming line is in a mark condition. If a spurious space is received a false start is given and the circuit operates as described. If the space was spurious, it is extremely unlikely that it will persist and so when the first three elements are examined one of them will be found to be mark. If the space does persist the scanning of the last element will detect the fact and the operation will be similar to the case when it does not persist. When the examination shows that one of the first three elements is a mark, SDA strikes and extinguishes SDN. The cathode of SDA becomes positive, causing a positive pulse to strike the stop tube SZ. SZ firing produces a negative pulse which is applied to the restore lead, R. The time-base and distributor restore to normal; a positive pulse is applied to the trigger of SDN from MCC K1 striking this tube and so extinguishing SDA. The equipment is now in readiness for the next start signal.

Consider the case when the correct start signal has been received and the synchronised terminal is operating normally, as already described. When an incorrect signal is received in place of one of the phasing elements, say, due to either a distributor mis-stepping or a spurious line signal, the stop tube SZ is struck and the time base and distributor react as for the case of a false start signal. The start tube is struck by the next reversal and again a check made to see if the phasing elements are correct. This checking for the presence of the three space phasing elements and resetting continues until the space phasing elements appear in the correct element positions when the synchronised terminal is in phase once again and continues to step in this condition.

The mark phasing element ensures that no matter what the polarity of the last information element, there is a reversal at the end of a cycle of the control terminal distributor which will start the synchronised terminal distributor so that the three space phasing elements appear in the correct time positions at this terminal. Thus, if correct phasing is lost due to a temporary fault condition, the synchronised terminal will effectively be stopped for one cycle and then will carry on in correct phase. Since cases might occur when it is impossible to run in correct phase, say, due to a faulty distributor, it must be possible to give an alarm if the two terminals are out of step for more than a predetermined time. At the end of the first cycle of the synchronised terminal distributor, OSO is struck applying a positive bias to MR21. When SDA strikes as a result of an out of phase condition, not only does the positive potential from its cathode strike SZ but also it biasses MR22. The combination of the biasses on MR21 and MR22 strikes OSA, extinguishing OSO. In the cathode of OSA, R, C and MR23 form a slow-charge quick-discharge circuit, so that the bias potential on MR24 rises very slowly and does not cause BA, in the alarm control, to strike immediately. If the two terminals get into step within a predetermined time OSO will restrike causing OSA to extinguish and so remove the bias from MR24. If the two terminals do not get back into step in the permitted time, BA will strike, thus extinguishing BR; AL is released and the visual and audible alarms operated via AL2 and AL3. AL4 applies a negative potential to the restore lead so resetting the time base and distributor, whilst AL1 removes the anode voltage from the synchronising phasing and alarm circuits. Further reversals can no longer operate the start tube until the synchronised terminal is reset.

It is possible for one of the tubes in the synchronized terminal distributor to cease stepping but the out-of-phase alarm would not operate, for even under these circumstances OSO could be restruck, which would remove the bias from MR24. For this reason a distributor stop detector is added. When AL1 is closed none of the tubes in the stop detector will strike but when the distributor steps the arrival of the glow on MCC K10 causes DSA to strike and remain struck until the distributor steps to MCD K9 when DSB strikes extinguishing DSA. Similarly DSC and then DSD will strike. Thus, whilst the distributor is stepping correctly, DSA and DSB and also DSC and DSD are switched back and forth. If any or all of the tubes in the distributor go out of action this switching will cease and the stop detector tubes which were last struck will remain in that condition. As for the out of phase alarm, slow charge-quick discharge circuits are included in the cathode circuits so that if any of the tubes remain struck for more than a specified time the relevant condensers will charge to a potential sufficient to trigger BA and so release the alarm relay.

A distributor stop detector and alarm control have not been included at the control station. It is possible to include a distributor stop detector but instead of having an alarm at this station the condition could be used to change one of the transmitted space synchronizing elements to a mark so that an alarm would be gven by the out-of-phase alarm at the synchronized terminal.

The alarm arrangement for the synchronized terminal will also detect that the incoming telegraph channel is in working order. Should the channel go out of commission the line condition will be a permanent space, which in due course will cause the out-of-phase alarm to operate. This does not give an alarm for a fault on the outgoing telegraph channel from the synchronised terminal, but this could be covered by an alarm at the control station. Since it might be preferred to have all alarms at one station, a simple means can be used to obviate this. The mark received in the last element position could be used at the control terminal to provide the transmitted element for the last position in the cycle. Thus, if either telegraph channel broke down, the synchronised terminal would receive a space in the last element position which, as described, would operate the out-of-phase alarm.

The function of the reset key in the circuit of the second winding of AL is as follows. After a fault has been rectified it may happen that adjustments have caused the glow on the time base and distributor tubes to move from the rest condition. To reset, the key is thrown, which strikes BR and operates AL; when AL5 closes, due to the differential winding of AL, the relay releases. AL4 closes and applies a negative voltage to the restore lead which resets the tubes to the rest condition. When the reset key restores, AL reoperates and the circuit is in readiness for the start signal.

Figure 7:
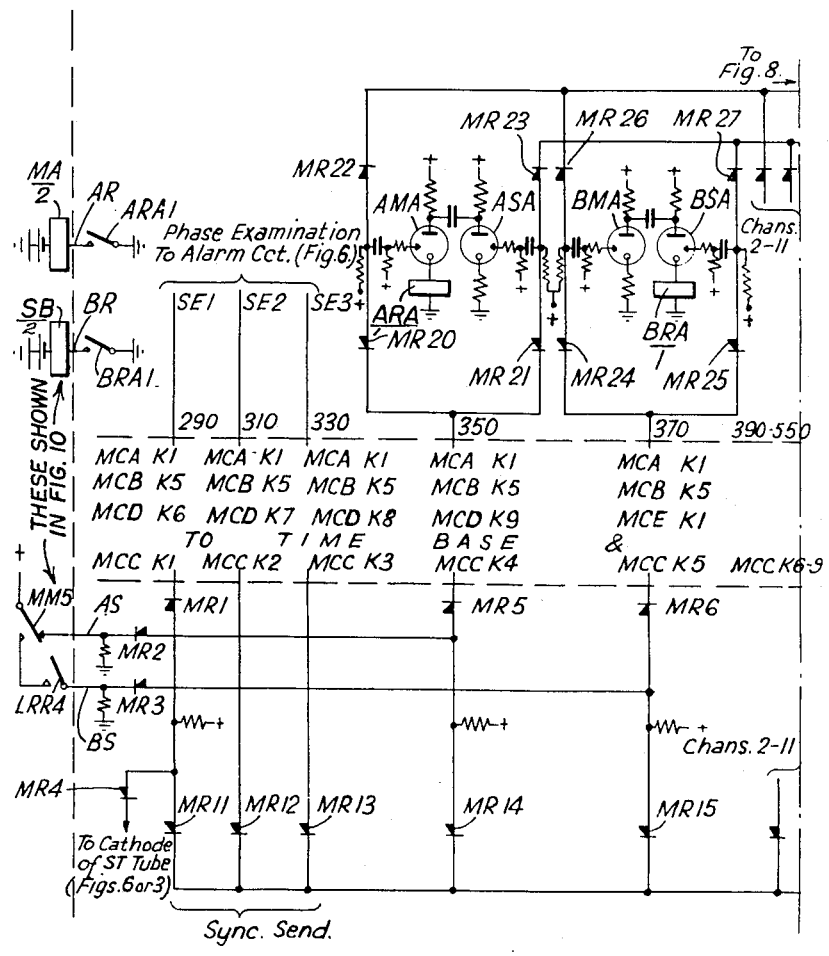
Figure 8:
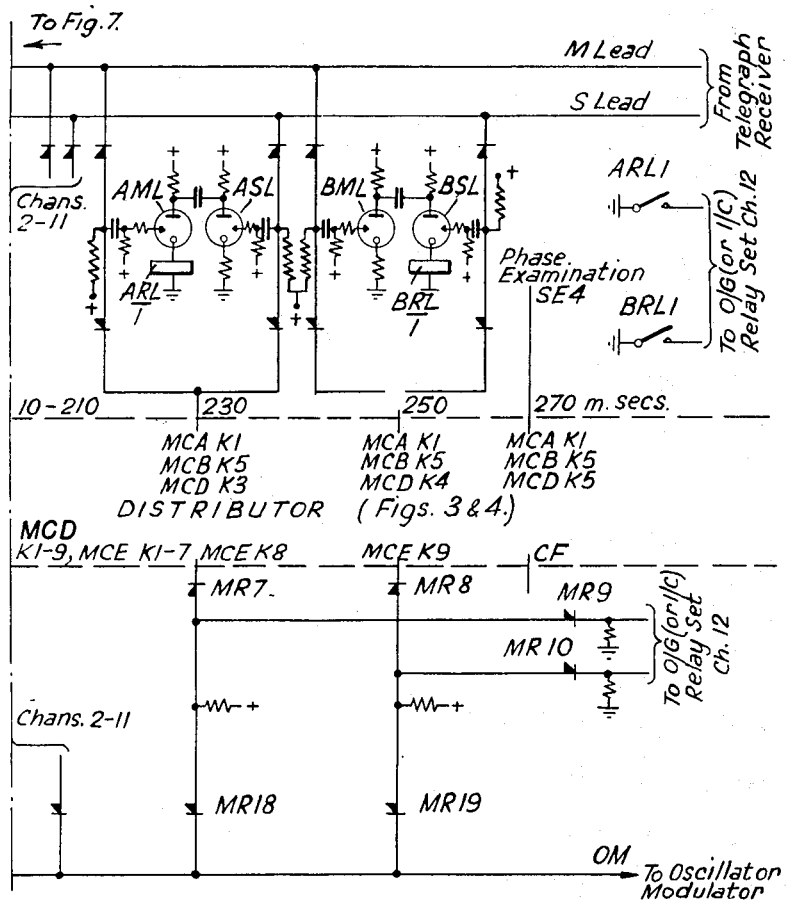

The circuit for the multiplex sender and detector is shown in Figs. 7 and 8.

In Fig. 7 the distributor connections are shown for the control terminal. At the synchronised terminal the sender and detector connections are the reverse of those shown, e. g. channel I receives on MCC K4 and MCC K5 (in conjunction with MCA K1 and MCB K5), and sends on MCD K9 and MCE K1. Also the phase examination leads are used at the synchronised terminal only.

First consider the multiplex sender, shown in the lower portions of Figs. 7 and 8. In the rest condition the distributor is standing on MCC K1 and rectifier MR1 (Fig. 7) is biassed positively. Since the start tube, ST, in the time-base and distributor circuit is not struck at this time, MR4 (Fig. 7) will be to earth, the result being that the common point will be at earth. All other distributor points will be to earth (the glow on the other distributor tubes being on the space cathodes), the result being that the common lead, OM (bottom of Fig. 8), to the oscillator modulator (indicated in Fig. 1) is at earth. In this condition, which is taken as mark, the oscillator modulator sends tone in a manner not shown to the common telegraph signalling channel. When the start key is operated, ST, Fig. 3 strikes and MR4 (Fig. 7) is biassed positively and, in conjunction with the positive bias on MR1, causes OM to become positive; the decoupling rectifiers, MR11 to MR19, are included to prevent the other connections from holding OM to ground. The positive bias applied to OM changes the condition of the modulator and tone is cut off from the signalling channel; this is the space condition. The change from mark to space when detected gives the start signal at the synchronised terminal.

After 20 milliseconds operation the distributor (Fig. 4) steps from MCC K1 to MCC K2. The stepping of the glow from K1 removes the positive bias from MR1 (Fig. 7) and, hence, the bias from MR11, but MR12 now has a positive bias from K2 so that OM remains positive and a space condition is sent to line. Similarly at the end of a further 20 milliseconds when the distributor steps to MCC K3 OM remains positive and another space is transmitted to line. Thus, after the start condition has been given, three space elements are transmitted; these are the three phasing elements which are transmitted at the beginning of each cycle.

When the distributor steps to MCC K4, MR5 is biassed positively. With contact MM5, in the outgoing relay set of channel 1, as shown in Fig. 7, MR2 has a positive bias, so that the common point will be positive and again OM is positive. This is a space condition which is the first element of a channel when the line is in the normal condition. In the next position of the distributor MR6 is biassed positively but with LRR4, as shown, MR3 will be at earth potential, so that the common point, and hence OM, will also be at earth. This causes the modulator to send tone to the line, which depicts a mark, the second element for a speech channel in the normal condition.

Figure 10:
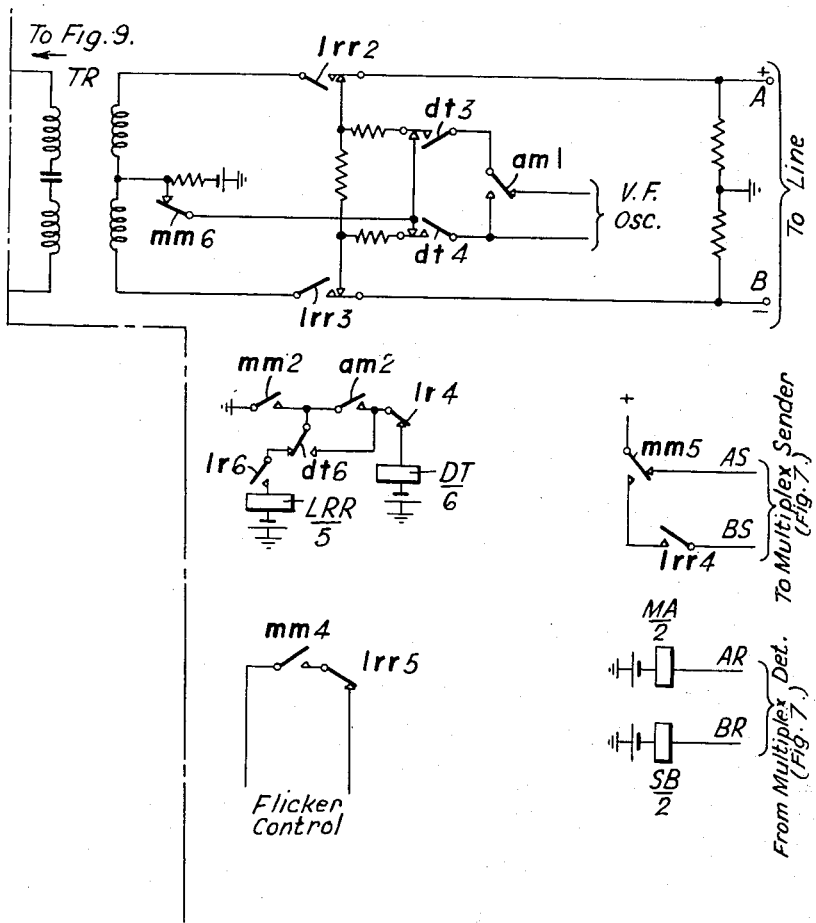

Contacts MM5 and LRR4 of the relays MM and LRR in the outgoing relay set, shown in Figs. 9 and 10, are used to change the conditions of the two elements associated with a particular channel. With both MM5 and LRR4 normal, the first element of a channel is a space and the second a mark; with MM5 operated and LRR4 normal, the elements are both marks; and with both MM5 and LRR4 operated, the elements are mark and space respectively. These combinations have been used for transmitting the various signalling codes.

As the distributor steps, the conditions given by the contacts connected to the distributor points will be transmitted in turn to the line. Since each point is in use for 20 milliseconds, telegraph elements will be sent at a speed of 50 bauds and these elements will give the information denoting the state of the various relay sets.

The last point of the distributor (Fig. 4), viz. CF, is not connected to OM (Fig. 7) for the element given by this point is the mark phasing element, and so, when the distributor reaches this point, OM will be at earth, which is the mark condition.

It might be thought that, since the rise and fall of the cathode voltages is quite finite, the turning on and off of the modulator would cause distortion of the telegraph signals. In practice the components used with the multicathode tubes are in the order of 27KΩ in the anode, 12KΩ and .005 µf. in the cathodes. These give time constants of 42 microseconds for the rise and 60 microseconds for the fall, the cathode voltage being about 35 volts. If the oscillator modulator is turned on when the voltage has risen to approximately 20 v. the distortion introduced is of the order of .15%. Furthermore, by examining a received element for 250 microseconds only in the middle of the element, this distortion may be neglected in practice. If desired the distortion can be completely eliminated, by using the potential of OM in conjunction with the master pulse train for turning the modulator on and off.

The connections of the multiplex detector (Figs. 7 and 8) to the distributor are different from those of the sender in two major respects. In the case of the sender it is necessary to send the condition of one element of a channel for the duration of that element so that the modulator either sends tone or cuts off tone for the signal being transmitted. With the detector there is a different state of affairs. The signal, as received, might have become distorted during transmission, and to overcome this distortion as far as possible, the best way to examine the incoming signal is to sample at the midpoint of an element. If the incoming elements are examined whilst the time base is on MCA K1 and MCB K5, it is possible to examine the incoming elements where distortion is not effective, unless the distortion is 50% or more, which state of affairs would mean that the circuit concerned was unfit for use. Apart from examining the incoming elements at their centres it is necessary to allot the signals to the correct receiving channels. This leads to the second major difference between the sender and detector connections to the distributor. In the sender, channel 1 is associated with MCC K4 and K5, the 4th and 5th distributor points. If a signal is sent on channel 1 and if similar cathodes at the distant terminal are used for detecting the signal, this means that the signal sent in reply, if necessary, would not be sent until the next cycle, which is 560 milliseconds after detecting the incoming signal. To shorten this interval, the return signal is sent after half a cycle only by associating channel 1 in the detector with MCD K9 and MCE K1 the 18th and 19th distributor points, and by having the reverse connections at the other terminal. This ensures that when one terminal is sending information, say, for channel 1, the other terminal is directing this information to the incoming relay set for channel 1 and that after half a cycle the second terminal will transmit information for channel 1, the first terminal directing this information to the correct relay set. Another advantage of the staggering of the sender and detector connections to the distributor is that when multiplex signalling is applied to both-way junction working it is possible to avoid collisions due to simultaneous seizure at the two ends.

In the above, the propagation time of the signals on the line has been ignored. When multiplex signalling is used on carrier circuits this is quite permissible. If, however, the signalling channel is on a long audio circuit the propagation velocity is lower and transit time may have to be considered. The effect can be overcome by arranging at the control terminal that the detection of incoming signals takes place at intervals removed from the arrangement, shown in Figs. 12 and 13, by a time interval equal to twice the propagation time of the line. For instance, let the propagation time be $t$ milliseconds. When the control terminal starts, the start signal arrives at the synchronised station $t$ milliseconds later and so this terminal starts in phase with the received signals and the sampling times will be as shown. Now, if the synchronised terminal sends a signal the control terminal will have stepped $2t$ milliseconds from the start and the detecting time will have to be altered accordingly. Since each cathode of MCA represents .25 millisecond and each cathode of MCB 2.5 milliseconds the order of accuracy to compensate for propagation time can be quite high.

Consider the operation of the detector, shown in the upper portions of Figs. 7 and 8. The incoming signals appear on the mark and space leads which are extended from the telegraph receiver, shown in Fig. 1. When one of these leads is at a positive potential the other is at earth, and vice versa. Take the case when the first element for a channel is being received at the control terminal. At this instant the distributor will be on MCD K9, so that, when the time-base arrives at MCA K1 and MCB K5, MR20 and MR21 (Fig. 7) will have a positive bias. If the mark lead is positive and the space lead is at earth, MR22 will have a positive bias, so that the common point of MR20 and MR22, Fig. 7, will become positive causing a positive pulse to pass to the trigger of AMA, Fig. 7. This pulse in combination with the standing positive bias strikes AMA, so operating relay ARA. If ASA had been struck previously it would be extinguished by the striking of AMA. The contact of relay ARA is used to pass information to the relay set. In the case of the outgoing relay set, the relay which operated according to the setting of the detector could be wired directly in the cathode, but in the case of the incoming relay set, the respective relays are heavily slugged and so the relief relay in the cathode is essential, for the current passed by the cold cathode tubes is not sufficient to saturate a slow release relay.

When the next element is received the time-base and distributor will have stepped and the sampling for this new element will be associated with MCE K1. Rectifiers MR24 and MR25 will be biassed positively so that BMA and BSA will be set according to the potentials indicated by the mark and space leads. Similarly all other elements in the cycle will be sampled so that at the end of a cycle the binary pairs comprising the detector will be set according to the elements received and will remain so until their particular element changes. By this means the information received is kept in a stored condition until the next change when a new setting is made. Each channel uses two binary pairs for storing the two elements concerned with that channel. The relay sets are operated accordingly to give the necessary supervisory signals etc.

It is possible that a signal may change after the first element but before the second has been transmitted. For this reason the code of signals should be devised so that one element only changes from the previous condition.

Before dealing with the outgoing relay set (Figs. 9 and 10), it may be worth while recapitulating what is required of this circuit. It must (a) Send "seize" signal when operator plugs in (mark-mark).

(b) Receive "proceed to dial" signal from distant end (mark-mark).

(c) Repeat dialled impulses to line as V. F. signals.

(d) Send "end of dialling" signal when operator restores her dial key (mark-space).

(e) Receive "subscribers answer" signal (mark-space).

(f) Receive "subscriber's clear" signal (mark-mark).

(g) Send "clear forward" when operator withdraws plug (space-mark).

(h) Guard channel against intrusion until distant end has cleared i. e. receive "full clear" signal from distant end (space-mark).

The lead AS controls the first and the lead BS the second element of the channel information. AR and BR are for received signals.

Transmitted space signals are characterised by positive potential on the leads AS or BS. Received signals are characterised by MA operated for a mark on the AR lead, SB operated for a space on the BR lead.

When the operator plugs in, relay M operates via its low resistance winding, prepares its holding circuit and operates its relief relay MM. Contacts mm6 remove the wetting potential from relay contacts dt3, dt4, contacts mm4 start the flicker are intermittent earth circuit, contacts mm3 operate MS, and contacts mm5 remove the positive potential from lead AS. MS removes the free line signal and extends the sleeve circuit. AS and BS are now at earth, so the signal sent over OM, Fig. 8, is the seizing signal mark-mark. Upon its receipt at the distant end a V. F. receiver is connected to the speech channel and the automatic equipment picked up in readiness to respond to the dialled train to follow. These conditions are made known by the return of signal mark-mark. Thus relay MA operates, locks MS, and replaces the full earth short on M's high resistance winding by an intermittent earth which causes the supervisory lamp in the cord circuit to flicker instead of glow continuously.

When the operator responds by throwing the associated dial key, battery is extended on the tip lead which operates relay AM. This disconnects the V. F. oscillator at am1 in readiness for the operation of DT, and at its second contact, completes DT's circuit. DT switches the incoming circuit to both impulsing windings of AM, prepares the outgoing line for impulsing, locks DT via MM operated, LR normal, and prepares LR's circuit via M relay and the sleeve circuit, replacing flicker by full glow. The operator dials and DC impulses are repeated by AM as V. F. impulses, AM restored, sending tone to line, and AM operated, sending no tone. At the distant end the automatic equipment responds and at the end of dialling the operator restores the dial key (not shown). This allows LR to operate which locks, temporarily holds AM to prevent a false line signal, prepares the sleeve circuit for supervision, disconnects DT relay and prepares LRR circuit. DT restores normal line condition, completes an earth circuit for the sleeve to give continuous glow on the cord circuit supervisory lamp and completes the LRR circuit. LRR operates, switches the outgoing side of the speech circuit through to the transformer TR in readiness for speech, disconnects AM's hold circuit and the flicker start circuit, and connects positive to the BS lead. The signal sent is thus mark-space, the end-of-dialling signal.

In response to this signal the distant end releases the V. F. receiver from the speech circuit. When the called party answers, the signal mark-space is returned to the calling end of the channel, and, in consequence, both relays MA and SB are now operated. SB further holds MS and removes the supervisory earth from the sleeve circuit so that the cord circuit lamp associated is dimmed. This is the speaking condition.

When the called party clears a signal of mark-mark is again received and thus relay SB restores, once more causing the cord circuit supervisory lamp to light, indicating the condition. The operator challenges and unplugs, thus releasing M which disconnects MM which in its turn releases LR and LRR, and so restores the circuit to normal except for MS and the signal receiving relay MA. With MM and LRR restored the transmit signalling conditions are restored to normal and thus we have SM transmitted. Receipt at the distant end eventually promotes release of the auto equipment and the return of an idle line condition signal space-mark to which MA releases and so releases MS, thus restoring the circuit to normal and giving the free line signal indication.

In Fig. 7 the relays MA and SB may be connected directly in the cathode of the multiplex detector in which case they are connected to earth.

Figure 11:
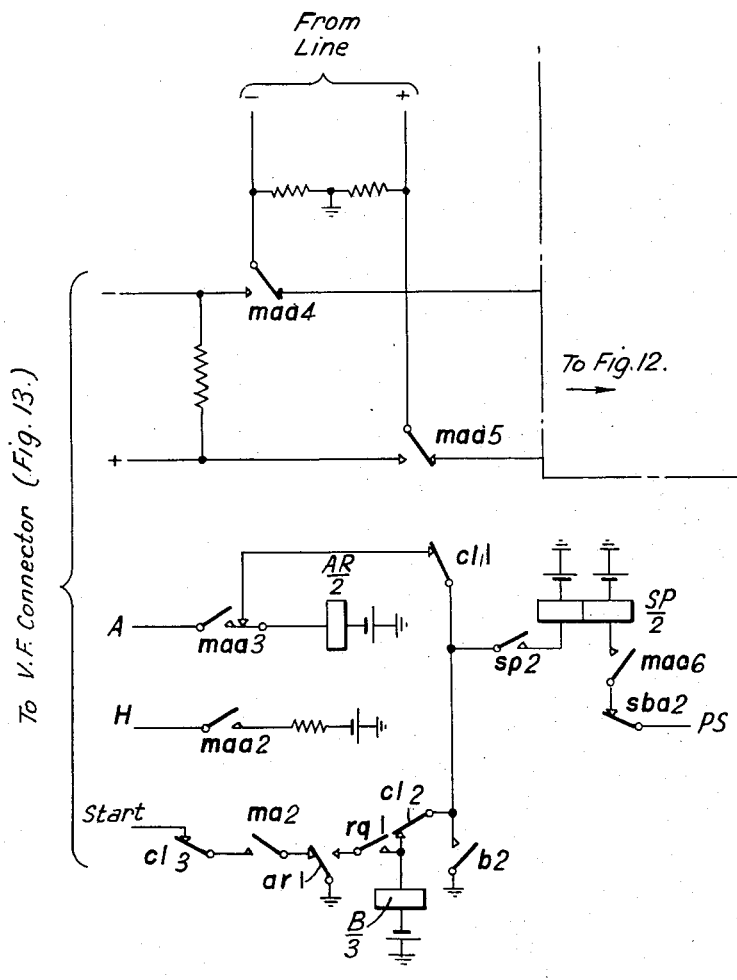

The circuit of the incoming relay set (Figs. 11 and 12) has been arranged to prevent false signals, causing difficulty in operation, and for signals mark-space (end of dialling), space-mark (clear) or space-space (line break) it is required that the condition persists for at least two cycles of the distributor.

The functions required of the circuit are as follows:

(a) Response to seize signal (mark-mark), connect V. F. receiver to speech pair and pick up auto equipment.

(b) Send proceed to dial signal (mark-mark).

(c) Receive end of dialling signal (mark-space) and disconnect V. F. receiver.

(d) When called subscriber answers send answer signal (mark-space).

(e) When called subscriber clears send subscriber clear signal (mark-mark).

(f) Relay flashing by sending subscriber clear, subscriber answer from the subscriber's switch hook.

(g) Respond to operator clear signal (space-mark) by releasing automatic equipment and (h) Sending idle line condition signal (space-mark) when all equipment is at rest.

In the idle condition the relays, MA and SB are normal and positive is extended on the AS lead, thus creating the signal of space-mark to the distant end. When the speech channel is taken into use the signal mark-mark is received and thus relay MA operates to start the V. F. connector circuit hunting for the calling circuit, and operates MAA. MAA completes the test and switching circuit of the V. F. connector, extends the positive and negative lines to it, prepares the SP relay circuit and the line loop.

When the V. F. connector finds the circuit the impulse relay AR is operated which disconnects the start and completes the loop to pick up the associated group selector shown in Fig. 1. This returns earth on the P lead which operates RG, which thus completes the B relay circuit via *ar*1 and removes positive from the AS wire to return "proceed to dial" mark-mark, to the operator.

Should the operator delay dialling for some predetermined period then the "S" pulse will mature to operate SP which locks to B and prepares the CL circuit for the following "Z" pulse. When the "Z" pulse matures CL will operate, cut off MAA, lock to MA and disconnect the V. F. connector start circuit. MAA releases the connector and AR restores, thus opening the forward loop and releasing the selector. B also restores, its circuit being broken by AR and CL, so that after its slow release period RG also restores and thus reconnects positive to the AS lead, transmitting the idle line signal space-mark. This restores MA at the distant end and causes the supervisory lamp to glow continuously indicating a clear condition.

If the operator does not delay dialling but proceeds, then the "Z" pulse does not become effective and the V. F. receiver responds to the received signals repeating them as normal D. C. impulses to AR which, in turn, controls the forward loop and so steps the switches as required.

When the operator restores the dial key, the end of dialling signal, thus generated, mark-space, operates SB in addition to MA. SB operates its relief relay SBA and this disconnects the "S" and "Z" pulse leads, and also disconnects MA. MA releases MAA and thus throws out the V. F. receiver and connector and prepares the circuit for speech, AR being maintained via the make-before-break contact of MAA, CL back and B operated. The combined release time of MA and MAA is such that the condition described must persist for at least one cycle of the distributor i. e. 560 milliseconds to prevent a false line signal causing premature release of the V. F. receiver and thus causing mutilation of the dialled digit.

When the called subscriber answers, D relay receives current due to the line reversal and this connects positive to the BS lead to transmit the answer signal mark-space to cause normal supervision. The conversation proceeds and when the called subscriber hangs up D restores thus removing the positive potential from the BS lead and so reverting to the mark-mark signal. Receipt of this signal at the distant end causes the cord circuit supervisory lamp to glow and thus give normal supervision. When the operator plugs out in response to a signal of clear or idle line, space-mark, is sent and this releases SB relay, and so also SBA, their combined release time being greater than one cycle time of the distributor to protect the circuit from premature release upon a false signal. Release of SBA completes the CL operating circuit via MAA back, RG operated. CL disconnects AR and B which restore. CL remains operated until RG restores after the earth has been removed from the P lead due to the release of the selector train following the release of AR. RG also restores the positive potential to the AS lead to send the "idle line" signal, space-mark.

From the point of view of the circuit the signals space-mark and space-space are identical, and thus, should a false space-space signal, compatible with a line disconnection occur, the same protection is given as for a false "clear" signal.

It will be seen that no time protection against false "seize" signals has been included. This has been omitted because a false "seize" merely picks up a V. F. receiver and the selector. They cannot be held, however, unless the signal persists; thus conditions restore to normal after a false signal and unless these are very frequent it seems unnecessary to include protection against them.

Signalling to the manual board appears to need no timing guard because the time constant of the operator provides this.

An earth start signal received upon the start chain "in" lead operates ST relay which lights the supervisory lamp LS (Fig. 13), prepares K relay circuit, completes the test relay TR circuit to the H arc, connects a start to the delayed alarm, and completes the LF uniselector stepping circuit under the control of TR. When the H wiper finds battery TR operates, cuts the drive and allows K relay to operate; it also extends a low resistance guarding earth to prevent another hunting connector switching-in to this also. K completes the circuit of arcs negative and positive, bridges the ST contact in the H arc, completes a locking circuit for itself, and operates relay KR. KR maintains the supervisory lamp and delayed alarm circuits, completes the A arc circuit, and switches the "in" to the "out" lead of the start chain, allowing, ST to restore.

Figure 12:
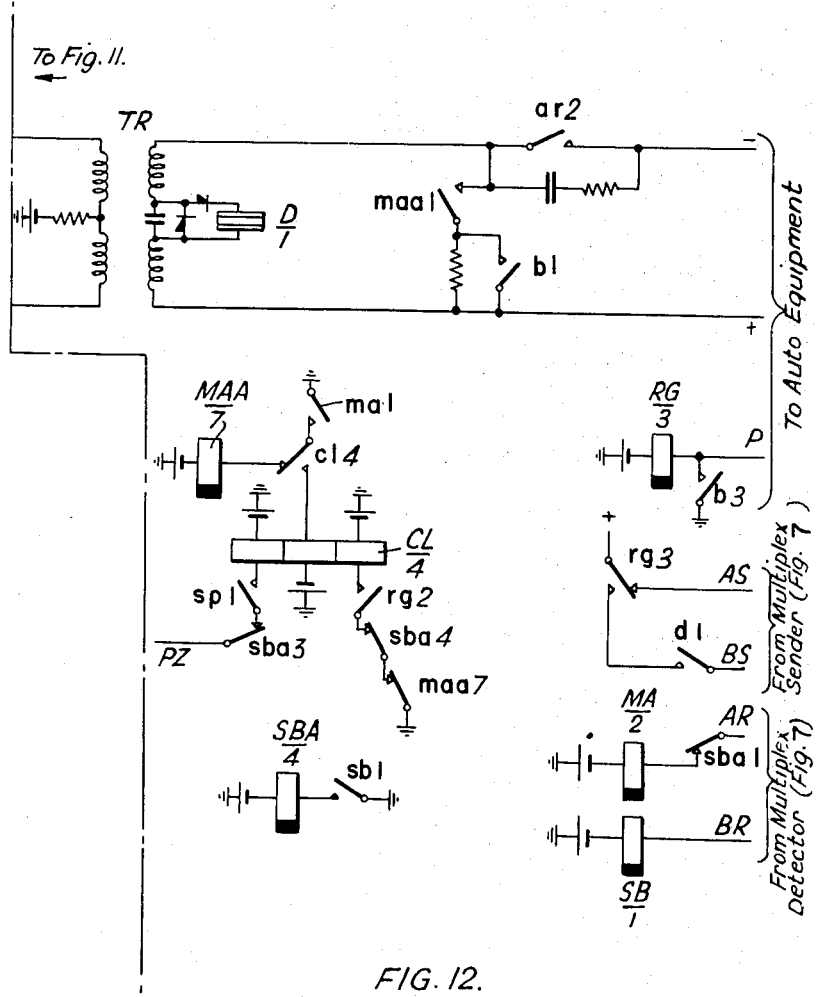
Figure 13:
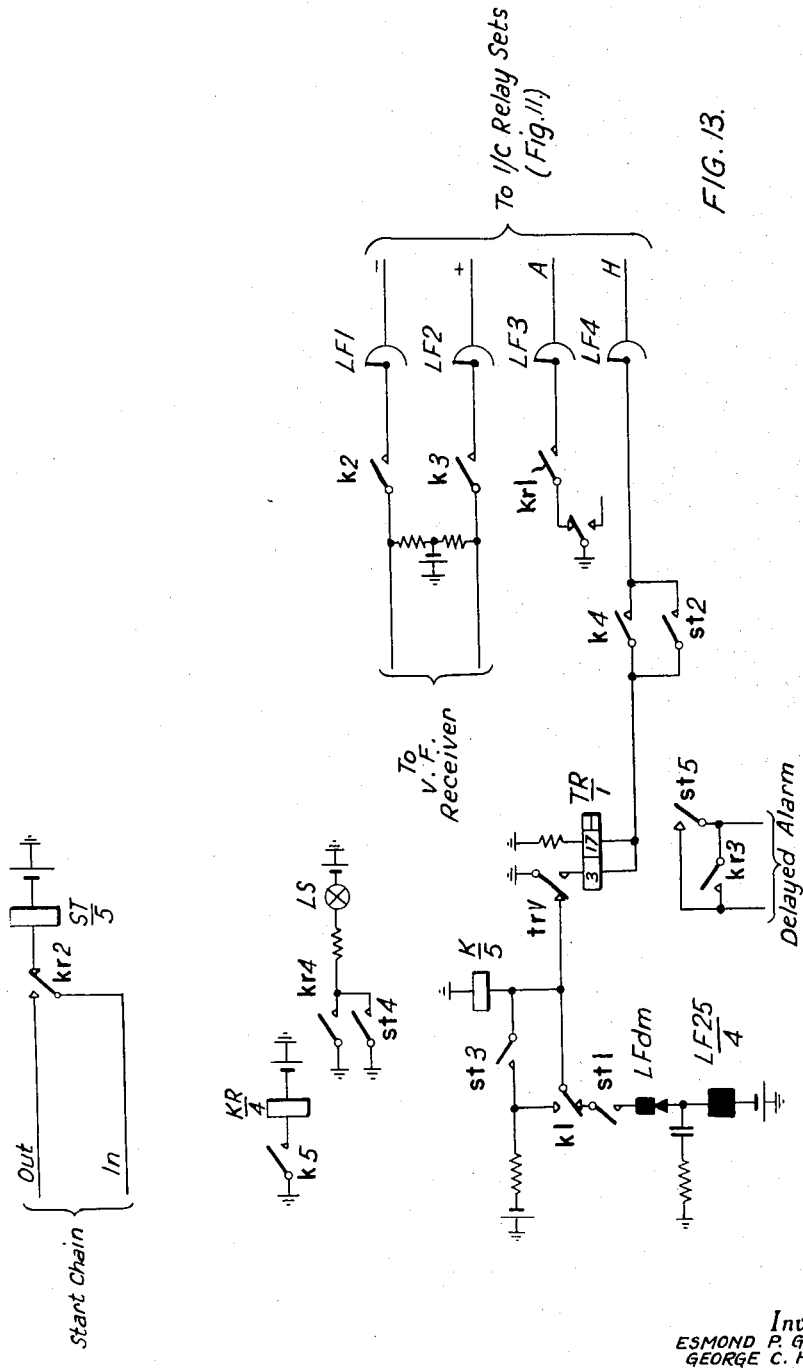
Fig. 13 shows a circuit for connecting a V. F. receiver to an incoming relay set for the transmission of dialling.

When the battery is removed from H arc by the release of MAA2 in Fig. 12, TR restores and shorts down K which, in turn, releases KR to establish normal conditions.

A system has been described which is almost the equivalent of D. C. signalling for, although the signals describing the particular line condition are transmitted only once per cycle, the receiving equipment does no more than store the condition until the next cycle of transmission when the distant condition is again examined. There can thus be a delay of up to nearly one cycle time of the distributor between origin of change of condition and recognition of such or a longer time if desired. As the cycle time occupies approximately only half a second, the delay involved can have little effect upon the efficiency of signalling.

As the signals are continually sent, the system may be made almost immune from false short duration signals. The system is, in fact, a D. C. system with slight time delay.

For dialling, such a delay makes the use of the same arrangement impossible, but where key pulsing or register to register working are required the selection information may be sent over, say, an additional telegraph type channel thus giving a "whole telegraph" system.

Inter-connection is simple and it is possible to devise a signalling terminal which is virtually part of the transmission system and to leave the detail of its application to given circumstances to be worked out as a straight-forward switching problem.

Figure 14:
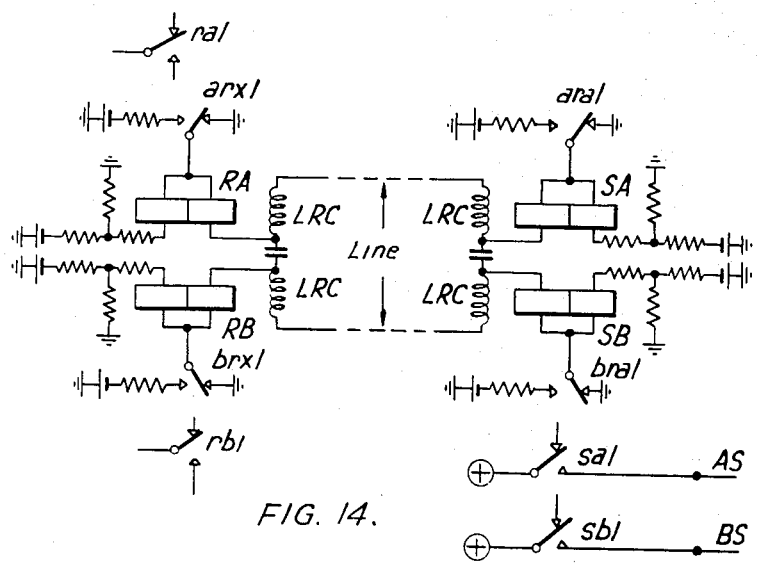
Figs. 14 and 15 show methods alternative to that in Fig. 13 for connecting a D. C. dialling system to the system.

This can be achieved in a number of ways, two of which are described. Figure 14 shows the most general possible case. In this arrangement the two conductors of the speech pair connecting the exchange to the transmission terminal are each provided with a conventional "half-duplex" earth return telegraph channel. The relays RA, RB, SA and SB are polarised relays connected to the line via the line repeating coils LRC in such a way that relay SA will follow the operations of contact *arx*1 of relay ARX (not shown) and relay RA those of contact *ara*1 of relay ARA (not shown) substantially independently. A similar relationship will exist on the other conductor for relays BRX and SB, and BRA and RB. If now, as is shown, relays SA and SB are arranged to control the multiplex sender by connecting their contacts to the AS and BS leads on Fig. 12, then we have a system in which we can have two relays ARX and BRX in the exchange relay set which can be operated independently, and can control over the multiplex channel the corresponding operations of two relays at the terminal exchange at the other end of the carrier channel.

Figure 15:
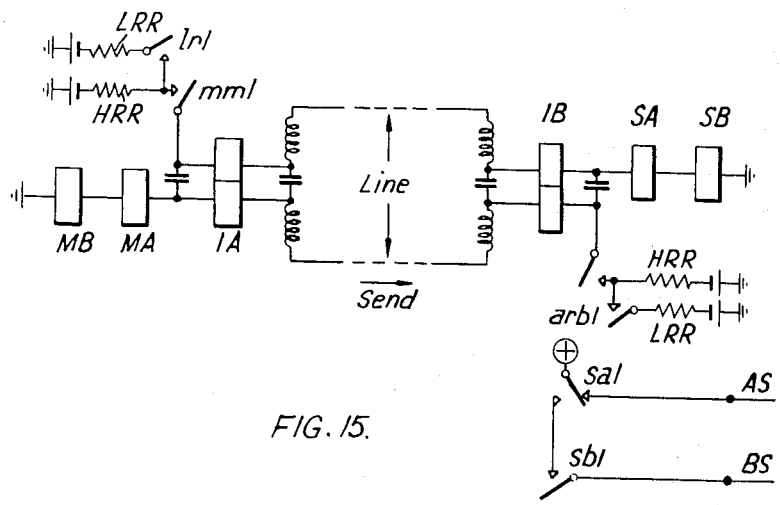

This arrangement is the most flexible possible in that it admits of completely independent control of the two elements which together provide the signalling for speech channel. This would give four independent signals and in practice, as in the case in the embodiment described, it is unlikely that more than three would be wanted as the associated D. C. circuits will not, in general, be capable of more than three. If this is the case it may well be that to facilitate "phasing" on the multiplex channel, it will be desired not to use one of the four signals either the double space or the double mark being omitted. For this case the somewhat simpler circuit is possible and this is shown in Fig. 15. Here one line is used for signalling in one direction and the other in the other direction. The three signals are then sent in each direction by means of relay margins in the form of no current, low current and heavy current. Thus in the "go" direction, if relay MM (not shown) operates and closes contact $mm1$, battery is fed to the line from high resistance HRR and transmits enough current to operate relay SA, while if LR (not shown) is subsequently operated to close $lr1$ more current is allowed via low resistance LRR and relay SB also operates. The operations in the reverse direction are essentially similar. It will be seen that this form of circuit would be completely appropriate to the conditions shown in Figs. 9 and 10. In Fig. 15 the retard coils IR and IB are inserted for impedance balancing.

Both these arrangements show transmission of the D. C. signals over the actual speech line and as a consequence an additional transmission bridge is needed. It would, however, be very simple to bring out the connections at the carrier terminal from the SA and SB relays in such a way that when the exchange equipment is adjacent, the signalling can be done over separate wires and the additional transmission bridge avoided.

The multiplex signalling system is capable of application to single frequency and carrier signalling systems, and can be used for automatic toll dialling in one direction and for manual service in the reverse direction. The application for manual operation is far superior to ringers because it is possible to use D. C. signalling rather than the pulse technique associated with indiscriminate ringing over the line. Furthermore the circuits provided for the manual service can remain in use with semi-automatic service it being necessary only to add the dialling equipment.

It will be appreciated that if each of the speech channels is associated with a two relay signalling circuit, the original seizing signal can be used to close contacts which can light the incoming operator's calling lamp. Where the channel is converted to automatic operation the same contacts can be used to call in the register circuit. The simple terminations to the multiplex system will also be valuable because it will simplify interworking between different types of automatic telephone exchange systems.

It will be evident that transmission of supervisory signals over the associated channel can occur in one direction at the same time as transmission of dialling signals in the other direction on the corresponding speech channel.

The invention has been described in relation to sleeve control to automatic working but it clearly applies to manual, auto-manual or automatic working.

While the principles of the invention have been described above in connection with specific embodiments, and particular modifications thereof, it is to be clearly understood that this description is made only by way of example and not as a limitation on the scope of the invention.

What we claim is:

1. Multi-channel carrier telecommunication terminal equipment for a carrier system having a plurality of telecommunication channels and a common signal channel comprising time division multiplex signalling equipment adapted to produce a repetitive cycle of time positioned pulses, means for allotting successive of said pulses for the signals of respective telecommunication channels, means responsive to a call originating on one of said telecommunication channels for transmitting the pulses allotted to that channel over said common signal channel, means for receiving pulses for said signal channel, separate control means for each telecommunication channel connected to said transmitting means and said receiving means, and means operated by said receiving means for actuating said control means to control the pulses transmitted at the time allotted to a telecommunication channel in accordance with signals originating on said telecommunication channel.

2. Multi-channel carrier telecommunication terminal equipment for a carrier system having a plurality of telecommunication channels and a common signal channel comprising time division multiplex signalling equipment adapted to produce a repetitive time position pulse, means for allotting successive of said pulses for the signals of respective telecommunication channels, means independent of said telecommunication channels for transmitting said pulses over said common signal channel, means for receiving pulses from said signal channel, separate control means for each telecommunication channel connected to said transmitting means and said receiving means, means operated by said receiving means for actuating said control means to control the pulses transmitted at the time allotted to a telecommunication channel in accordance with signals originating on said telecommunication channel, a source of carrier frequency, and means for automatically deriving the time division multiplex time signal from said source of carrier frequency.

3. Carrier telecommunication terminal equipment, as claimed in claim 2, and in which the time division multiplex signalling equipment comprises multi-gap gas-discharge counting tubes for suitably dividing the carrier frequency source for signal purposes.

4. Carrier telecommunication terminal equipment, as claimed in claim 2, and in which the multiplex signalling equipment comprises multi-gap gas-discharge tubes from the cathodes of which the required cycle of pulse elements are made available.

5. Carrier telecommunication terminal equipment, as claimed in claim 4, in which the separate means for each telecommunication channel for controlling the pulses comprises electronic gates individually allocated to the telecommunication channels and controlled by signals on the individual telecommunication channels in association with multiplex pulses individually allocated to said channels to determine the character of the signals sent out in the time positions allocated to the respective channels.

6. Carrier telecommunication terminal equipment, as claimed in claim 5, in which the receiving means further comprises static electrical switches, one per signal time position of the multiplex equipment, and controlled by the incoming multiplex signals and by multiplex pulses individually allocated to the telecommunication channels to determine the character of signals received in time positions allocated to the respective telecommunication channels.

7. Carrier telecommunication terminal equipment for a carrier system having a plurality of telecommunication channels and a common signal channel comprising individual signalling circuits for said telecommunication channels, a multiplex distributor, a multiplex sender connected with said distributor and with said individual signalling circuits, a telegraph signal transmitter connected with said multiplex sender, means controlled by said individual signalling circuits and said distributor to operate said sender to cause said transmitter to transmit signals over said common signal channel corresponding to signals originating in said individual signalling circuits, a multiplex detector connected with said distributor and with said individual signalling circuits, a telegraph signal receiver connected with said multiplex detector and with said common signal channel, and means responsive to signals received by said telegraph receiver and controlled by said distributor for causing said multiplex detector to transmit signals to said individual signalling circuits.

8. Carrier telecommunication system comprising incoming and outgoing terminal equipment, as claimed in claim 1, comprising independent time division multiplex signalling equipments at the terminals, and means for automatically correcting lack of synchronism between the two equipments.

9. Carrier telecommunication system, as claimed in claim 8, in which the correcting means comprises automatic synchronism test and correction equipment adapted to test the synchronism and change the speed relation if not in synchronism and automatic phase test and correction equipment adapted to test the phase of said signalling equipments and adjust the phase relation if not correct.

10. Carrier telecommunication system, as claimed in claim 9, further comprising means at one terminal only for connecting the automatic test and correction equipment to the time division multiplex signalling equipment at that terminal.

11. Multi-channel carrier telecommunication terminal equipment for a carrier system having a plurality of telecommunication channels and a common signal channel comprising independent time division multiplex signalling equipments at the terminals adapted to produce a repetitive cycle of time positioned pulses, means for automatically correcting lack of synchronism between the two equipments, means for allotting successive of said pulses for the signals of telecommunication channels, means independent of said telecommunication channels for transmitting said pulses over said common signal channel, means for receiving pulses from said signal channel, separate control means for each telecommunication channel connected to said transmitting means and said receiving means, and means operated by said receiving means for actuating said control means to control the pulses transmitted on the time allotted to a telecommunication channel in accordance with signals originating on said channel, said correcting means comprising automatic synchronism test and correction equipment adapted to test the synchronism and change the speed relation if not in synchronism, and automatic phase test and correction equipment adapted to test the phase of said signalling equipments and adjust the phase correction if not correct, said test and correction equipment comprising means for detecting changes of condition, such as current reversals, on the signal channel, and means for comparing the time of a change of condition with the time cycle of said one terminal to detect any out-of-synchronism condition.

12. Carrier telecommunication system, as claimed in claim 11, and in which said comparing means comprises normal, slow, and fast comparison devices.

13. Carrier telecommunication system, as claimed in claim 12, further comprising a plurality of different pulse sources for controlling the time division multiplex signalling equipment, said sources being of the same frequency but out of phase, means for normally using one of said pulse sources for controlling said equipment, and means for interpolating a pulse from another of said sources into said control means when said signalling equipment is running slow.

14. Carrier telecommunication system, as claimed in claim 13, further comprising means for suppressing a pulse from said normally-used source when the signalling equipment is running fast.

15. Multi-channel carrier telecommunication terminal equipment for a carrier system having a plurality of telecommunication channels and a common signal channel there being incoming and outgoing terminal equipments with independent time division multiplex signalling equipments at the terminals adapted to produce a repetitive cycle of time positioned pulses, means for allotting successive of said pulses for the signals of respective telecommunication channels, means independent of said telecommunication channels for transmitting said pulses over said common signal channel, means for receiving pulses from said signal channel, separate control means for each telecommunication channel connected to said transmitting means and said receiving means, and means operated by said receiving means for actuating said control means to control the pulses transmitted at the time allotted to a telecommunication channel in accordance with signals originating on said telecommunication channel, in which the time cycle for controlling one of the signalling equipments comprises a plurality of phase-controlling time positions additional to the time positions allocated for channel signalling, means for checking the occurrence of particular conditions in the phase-controlling time positions, each condition being individual to the corresponding phase-controlling time-position, and means for resetting the signalling equipment to normal condition if an incorrect condition is detected in any one of said phase-controlling time positions.

16. Carrier telecommunication system, as claimed in claim 15, and further comprising means for performing a further operation if an incorrect phasing condition is detected in a predetermined number of successive cycles of the time division multiplex signalling equipment.

17. Multi-channel carrier telecommunication terminal equipment for a carrier system having a plurality of telecommunication channels and a common signal channel comprising time division multiplex signalling equipment adapted to produce a repetitive cycle of time positioned pulses, means for allotting successive of said pulses for the signals of respective telecommunication channels, means independent of said telecommunication channels for transmitting said pulses over said common signal channel, means for receiving pulses from said signal channel, separate control means for each telecommunication channel connected to said transmitting means and said receiving means, and means operated by said receiving means for actuating said control means to control the pulses transmitted at the time allotted to a telecommunication channel in accordance with signals originating on said telecommunication channel, a voice frequency signal receiver associated in common with said telecommunication channels and means for temporarily connecting said receiver individually to one of said telecommunication channels for receiving voice frequency dial signals sent over said channel.

18. Multi-channel carrier telephone equipment, as claimed in claim 17, futher comprising means for directing dial signals for a telecommunication channel over said telecommunication channel in the form of voice frequency signals.

19. Multi-channel carrier telecommunication terminal equipment for a carrier system having a plurality of telecommunication channels and a common signal channel comprising independent time division multiplex signalling equipment at the terminals adapted to produce a repetitive cycle of time positioned pulses, means for allotting successive of said pulses for the signals of respective telecommunication channels, means for transmitting the said pulses over said common signal channel, means for receiving pulses from said signal channel, separate control means for each telecommunication channel connected to said transmitting means and said receiving means, and means operated by said receiving means for actuating said control means to control the pulses transmitted on the time allotted to a telecommunication channel in accordance with signals originating on said telecommunication channel, the allotting means comprising means for allotting a predetermined pulse with respect to a particular channel to the transmitting means at one terminal and to the associated receiving means at the other terminal, and means for allotting a different pulse to the receiving means at said one terminal and to the transmitting means at the other terminal whereby simultaneous selection of the same time position at both ends is prevented.

20. Multi-channel carrier telephone terminal equipment comprising a plurality of speech channels, a single telegraph channel, equipment for detecting and transmitting successive signals on a time division multiplex basis over said telegraph channel representative of respective said speech channels, signals relating to a particular speech channel being sent and received via said telegraph channel in time positions allocated to said particular speech channel, an individual terminal circuit for each speech channel, regular telephone exchange equipment, means for connecting each said terminal circuit to said regular telephone exchange equipment, means in each said terminal circuit for accepting direct current supervisory signals from said exchange equipment and for repeating said signals to said transmitting equipment for transmission over said telegraph channel, and means in each said terminal circuit for responding to signals from said detecting equipment and for repeating them to exchange equipment in the form of regular direct current supervisory signals acceptable to the exchange equipment, whereby the whole problem of handling exchange supervisory signals via the carrier channels is taken care of by the carrier equipment itself.

21. Multi-channel carrier telephone terminal equipment, as claimed in claim 20, and further comprising means in each said terminal circuit for repeating dialled digits in the form of voice frequency signals over the respective speech channel.

22. Multi-channel carrier telephone terminal equipment, as claimed in claim 20, and further comprising voice frequency signal responsive equipment associated with said terminal circuits, means in each said terminal circuit for responding to a seizure signal received by said telegraph detector equipment and relating to the respective speech channel, and means for temporarily connecting together voice frequency signal responsive equipment and said terminal circuit in response to said seizure signal in readiness to receive dialled digits in voice frequency form.

23. Multi-channel carrier telephone terminal equipment, as claimed in claim 22, in which the regular exchange equipment includes automatic selector equipment, and in which said voice frequency signal responsive equipment comprises means for repeating digits received in voice frequency form via said terminal circuit to said automatic selector equipment.

24. Multi-channel carrier telephone terminal equipment, as claimed in claim 20, and comprising means in said telegraph detector equipment for repeating signals received via the telegraph channel to the terminal circuit of the speech channel to which said signal relates.

References Cited in the file of this patent

UNITED STATES PATENTS

| | | |
|---|---|---|
| 2,143,163 | Monk | Jan. 10, 1939 |
| 2,429,631 | Labin et al. | Oct. 28, 1947 |
| 2,479,701 | Ress | Aug. 23, 1949 |
| 2,548,661 | Feldman | Apr. 10, 1951 |
| 2,581,442 | Reeves | Jan. 8, 1952 |